(12) United States Patent
Nylund (10) Patent No.: US 8,942,748 B2
(45) Date of Patent: Jan. 27, 2015

(54) ADAPTERS FOR FACILITATING HALF-DUPLEX WIRELESS COMMUNICATIONS IN PORTABLE ELECTRONIC COMMUNICATIONS DEVICES, AND SYSTEMS COMPRISING SAME

(75) Inventor: Blake J. Nylund, Lynchburg, VA (US)

(73) Assignee: Harris Corporation, Melbourne, FL (US)

( * ) Notice: Subject to any disclaimer, the term of this patent is extended or adjusted under 35 U.S.C. 154(b) by 354 days.

(21) Appl. No.: 13/372,810

(22) Filed: Feb. 14, 2012

(65) Prior Publication Data

US 2013/0210475 A1  Aug. 15, 2013

(51) Int. Cl.
*H04B 7/00* (2006.01)
(52) U.S. Cl.
USPC ....... 455/518; 455/404.2; 455/90.2; 455/90.3
(58) Field of Classification Search
CPC ..................................................... H04W 4/10
USPC .............................. 455/518, 404.2, 90.2, 90.3
See application file for complete search history.

(56) References Cited

U.S. PATENT DOCUMENTS

| | | | |
|---|---|---|---|
| 8,014,733 B1* | 9/2011 | Gailloux et al. | 455/90.3 |
| 2002/0013161 A1* | 1/2002 | Schaeffer et al. | 455/557 |
| 2008/0174478 A1* | 7/2008 | Whiteside et al. | 342/357.1 |
| 2012/0008300 A1* | 1/2012 | Ladouceur et al. | 361/807 |
| 2012/0172090 A1* | 7/2012 | Capps | 455/566 |
| 2012/0282977 A1* | 11/2012 | Haleluk | 455/556.1 |
| 2013/0122852 A1* | 5/2013 | Crestol | 455/404.2 |

* cited by examiner

*Primary Examiner* — Sanh Phu
(74) *Attorney, Agent, or Firm* — Robert J. Sacco, Esq.; Fox Rothschild LLP (57) ABSTRACT

Adapters (10) for use with portable electronic communications devices (12) such as cellular phones, smart phones, and personal digital assistants can facilitate use of the devices (12) in half-duplex communications modes such as push to talk (PTT) and land portable radio (LMR). The adapters (10) can include a case (18) configured to receive the communications device (12), and a button or key (40) mounted on the case. The key (40) communicates with the communications device (12) when the communications device (12) is disposed in the case (18), and is operable to generate on a selective basis an input corresponding to a transmit command that causes the communications device (10) to transmit. The adapters (10) can also include a speaker module and a microphone that communicate with the communications device (10) via a connector (28) on the case (18), or wireless transceivers (41a, 41b).

28 Claims, 5 Drawing Sheets

ADAPTERS FOR FACILITATING HALF-DUPLEX WIRELESS COMMUNICATIONS IN PORTABLE ELECTRONIC COMMUNICATIONS DEVICES, AND SYSTEMS COMPRISING SAME

BACKGROUND OF THE INVENTION

1. Statement of the Technical Field

The inventive arrangements relate to portable electronic communications devices, such as cellular phones, smart phones, and personal digital assistants (PDAs), capable of operating in half-duplex communications modes such as push to talk (PTT).

2. Description of Related Art

Some types of portable electronic communications devices transmit and receive radio-frequency (RF) energy in a communication mode known as "half duplex." In the half-duplex communications mode, signal transmission can occur in two directions, i.e., to and from each user. The signal transmission, however, can occur in only one direction at a time. To facilitate transmission in a particular direction, the user of the transmitting device typically actuates a button or key on his or her communications device. The button or key, when actuated, generates an input that is interpreted by the communications device as a transmit command. This mode of operation is commonly referred to as push-to-talk or PTT.

PTT is a form of half-duplex communication that is frequently used in land mobile radio (LMR) devices. LMR devices are a class of radio equipment designed for use by mobile government and commercial users to communicate, usually on land. For example, LMR devices are commonly used by emergency responders such as firefighters and paramedics; construction crews; security guards; etc.

Portable electronic communications devices, such as PDAs, cellular phones, and smart phones, i.e., cellular phones with enhanced computing functionality and connectivity capabilities, are in widespread use. Most of the portable electronic communications devices currently in use do not have the capability to operate in the half-duplex mode. For example, most cellular phones, smart phones, and PDAs are not equipped with any means to generate a PTT user input corresponding to the transmit command required for half-duplex operation. To the extent these devices can be adapted, through software modifications, to generate such a command based on an input from a touch-screen, such an approach is not practical because it can be difficult for a user to hold his or her finger over a particular location on a touch screen on a repetitive and prolonged basis, as may be required during PTT, LMR, and other half-duplex modes of operation.

Moreover, the speakers and microphones of many cellular phones, smart phones, and PDAs are not suitable for operation with the high background noise levels that are often present during operation of LMR devices. Also, the relatively high power consumption of LMR communications devices can make the battery life of a cellular phone, smart phone, or PDA operating in these modes unacceptably short.

SUMMARY OF THE INVENTION

Embodiments of communications systems include a portable electronic communications device. The communications device has a processor, a memory that communicates with the processor, computer-executable instructions stored on the memory, and a transceiver that communicates with the processor. The transceiver is operable to send and receive radio-frequency signals to and from a telecommunications network. The computer-executable instructions are configured so that, when executed on the processor, they will cause the communications device to transmit only when receiving an input corresponding to a transmit command.

Embodiments of communications systems also include an adapter. The adapter has a case configured to receive the communications device, and a key mounted on the case. The key communicates with the communications device when the communications device is disposed in the case, and the key is operable to generate on a selective basis the input corresponding to the transmit command.

In accordance with another aspect of the disclosed inventive concepts, embodiments of adapters for use with portable electronic communications devices include a case configured to receive the device, and a key mounted on the case. The key communicates with the communications device when the communications device is disposed in the case, and is operable to provide the communications device with an input on a selective basis.

BRIEF DESCRIPTION OF THE DRAWINGS

Embodiments will be described with reference to the following drawing figures, in which like numerals represent like items throughout the figures and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The figures depict an adapter 10 for use with a portable electronic communications device 12. The adapter 10, in conjunction with software on the communications device 12, can facilitate the use of the communications device 12 in a half-duplex communication mode such as PTT. The communications device 12 can be, for example, a conventional commercial available cellular phone, personal digital assistant (PDA), smart phone, etc. that does not come equipped from the manufacturer with the capability to operate in a PTT or other half-duplex communication mode.

The communications device 12 is equipped with a software application 14 that facilitates use of the communications device 12 in the PTT mode. The software application 14 is depicted diagrammatically in FIG. 7. The software application 14 can be any commercially-available application that facilitates PTT operation on a smart phone or other type of portable electronic device. For example, the BeOn® PTT software application, available from Harris Corporation of Melbourne, Fla., can be installed on the communications device 12 to facilitate PTT operation over broadband networks such as 3G, WiFi, 4G/LTE, etc., including interoperability with an LMR network. Alternatively, the software application 14 can be developed specifically for use with the adapter 10 and the communications device 12. The software application 14 can facilitate other types of half-duplex communication modes, such as LMR, in alternative embodiments of the communications device 12. As an example, the above-referenced BeOn® application can provide seamless PTT communications between the communications device 12, and an LMR network servicing critical communicators such as police, fire, and federal agencies.

Figure 1:
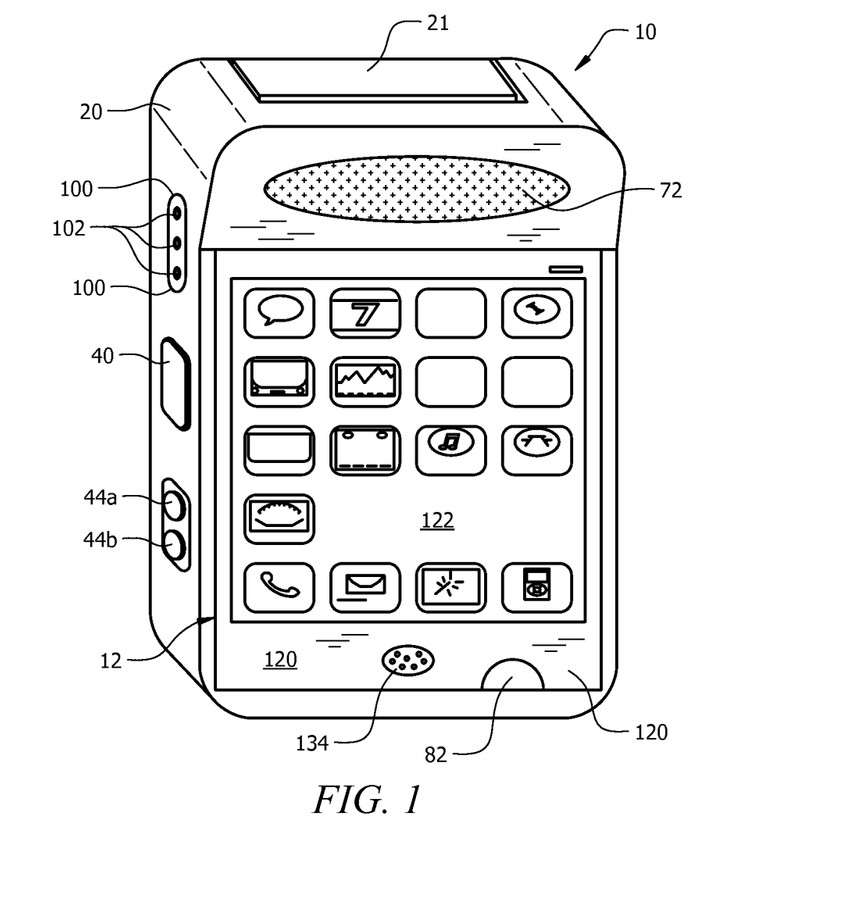
FIG. 1 is a perspective view of a portable electronic communications device installed in an adapter that facilitates use of the portable electronic communications device in a half-duplex communications mode, with a sleeve of the adapter removed and not shown.
Figure 7:
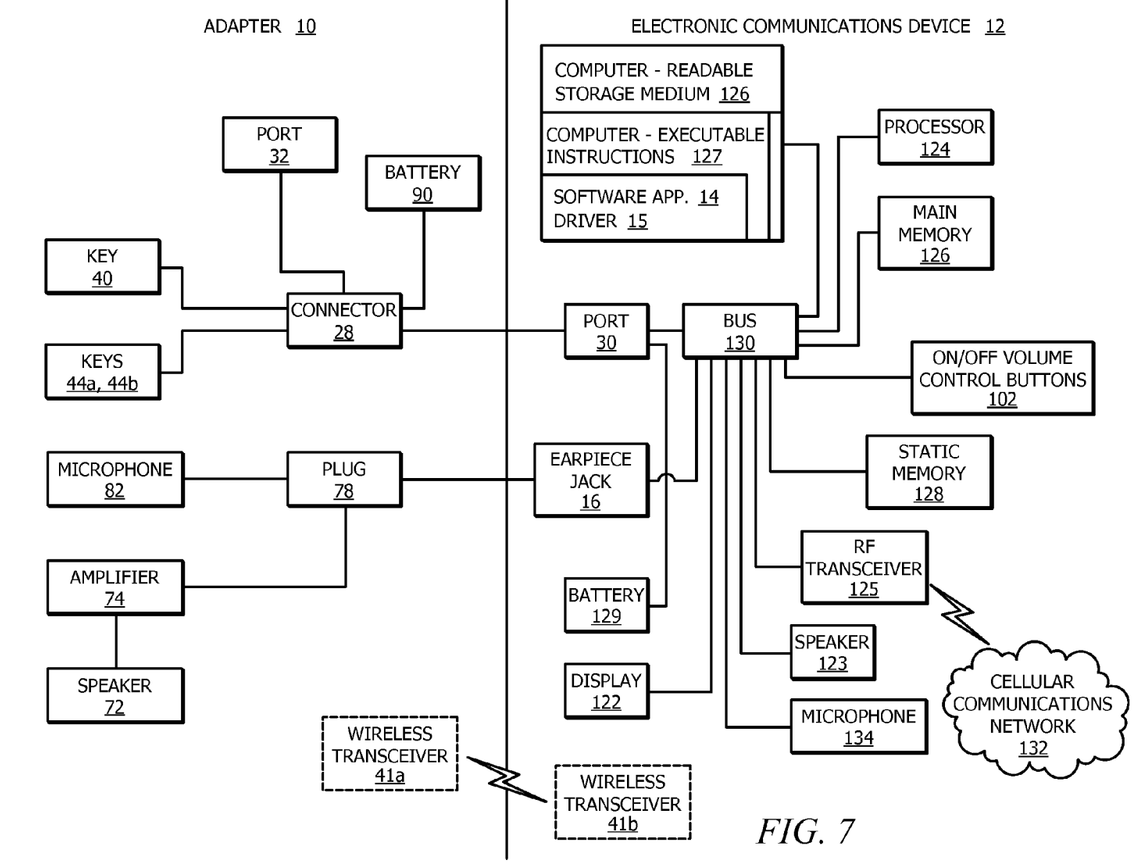
FIG. 7 is a block diagram depicting various electrical and electronic components of the portable electronic communications device and the adapter shown in FIGS. 1-6.

The communications device 12 comprises a body 120, and a display 122 mounted on the body 120 as depicted in FIG. 1. As shown in FIG. 7, the communications device 12 also includes a processor 124, such as a central processing unit (CPU), a graphics processing unit (not shown), a main memory 126, and a static memory 128 which communicate with each other via a bus 130. The communications device 12 also includes a speaker 123, a microphone 134, a battery 129, and a radio-frequency (RF) transceiver 125 that facilitates communications with a cellular or other broadband communications network 132.

As further illustrated in FIG. 7, the communications device 12 also includes a computer-readable storage medium 126 on which is stored one or more sets of computer-executable instructions 127, e.g., software code, configured to implement one or more of the methodologies, procedures, or functions described herein. The instructions 127 can also reside, completely or at least partially, within the main memory 126, the static memory 128, and/or within the processor 124 during execution of the instructions 27 by the processor 124. The main memory 126 and the processor 124 also can include machine-readable media.

The term "computer-readable storage medium" shall also be taken to include any medium that is capable of storing, encoding, or carrying a set of instructions for execution by the processor 124 and that cause the processor 124 to perform any one or more of the methodologies, procedures, or functions described herein. The term "computer-readable storage medium" shall be taken to include, but not be limited to, solid-state memories such as a memory card or other package that houses one or more read-only (non-volatile) memories, random access memories, or other re-writable (volatile) memories; and/or magneto-optical or optical medium such as a disk or tape.

Those skilled in the art will appreciate that the system architecture illustrated in FIG. 7 is one possible example of a portable electronic communications device configured in accordance with the inventive concepts disclosed herein. However, the invention is not limited in this regard and any other suitable computer system architecture can also be used without limitation.

The adapter 10 comprises a case 18. The case 18 comprises shell 20, and a sleeve 24 removably disposed over the shell 20. The sleeve 24 is not shown in FIG. 1, and the outline of the sleeve 24 is depicted in phantom in FIGS. 2-6 so that the underlying shell 20 is visible. The shell 20 is formed from a suitable impact-resistant material such as polycarbonate, and is configured to fit snugly around the communications device 12. The shell 20 includes a lid 21 that swivels between open and closed positions as denoted by the arrow 22 in FIG. 3, to permit the communications device 12 to be inserted into and removed from the shell 20.

Alternative embodiments of the shell 20 can be configured in other ways to accommodate insertion and removal of the communications device 12. For example, the lid 21 can be disposed at the bottom of the shell 20 in alternative embodiments. As another example, one or both sides of the shell 20 can be equipped with a movable structure such as the lid 21, to facilitate insertion and removal of the communications device 12 via the sides of the shell 20. In other alternative embodiments, the shell 20 can be formed in two pieces, such as a top and a bottom half or a left and a right half. The two pieces can be releasably secured to each other by snaps, latches, or other suitable means.

Figure 2:
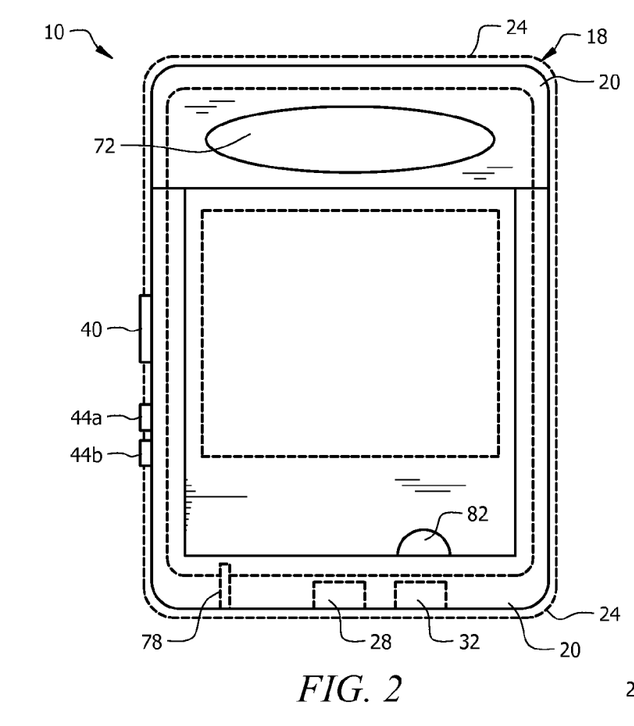
FIGS. 2-6 are front, side, top, bottom, and rear views, respectively, of the adapter shown in FIG. 1, with the sleeve of the adapter depicted in phantom.

The sleeve 24 is formed from a suitable impact-absorbing material such as silicone. The shell 20 and the sleeve 24 each have an opening formed therein to permit the display 122 of the communications device 12 to be viewed when the communications device 12 is positioned within the case 18, as shown in FIGS. 1 and 2.

The shell 20 and sleeve 24 can be used, for example, in applications where it is necessary to protect the communications device 12 from impact, crushing, etc., and where it is not necessary to impose strict limitations on the overall size of the adapter 10. One such possible application is a uniformed police officer who is not concerned with keeping his use of a PTT or LMR-equipped communications device from view.

In alternative embodiments, the adapter 10 can comprise a relatively compact shell formed from a suitable impact-absorbing material such as silicone, i.e., a silicone skin can be positioned directly on the communications device 12 in lieu of the rigid shell 20. This particular configuration can be used, for example, in applications where it is necessary to impose strict limitations on the overall size of the adapter 10, and protection of the communications device 12 from impact, crushing, etc. is not as critical as the size limitation. One such possible application is an undercover police officer who, for tactical reasons, wishes to keep his use of a PTT or LMR-capable communications device from view.

The adapter 10 also includes a connector 28 that mates with a compatible port 30 on the communications device 12, to facilitate communications between the adapter 10 and the communications device 12. The connector 28 is depicted in FIGS. 2 and 7; the port 30 is shown in FIG. 7. The connector 28 can be, for example, a universal serial bus (USB) type "A" male connector that mates with a USB type "A" female connector port 30 on the communications device 12. The connector 28 is securely mounted on a bottom inner surface of the shell 20, so that the connector 28 engages the port 30 when the communications device 12 is inserted in the shell 20. The connector 28 can be mounted on the side of the shell 20 in alternative embodiments, to accommodate communication devices 12 in which the port 30 is located on the side of the communications device 12.

Figure 5:
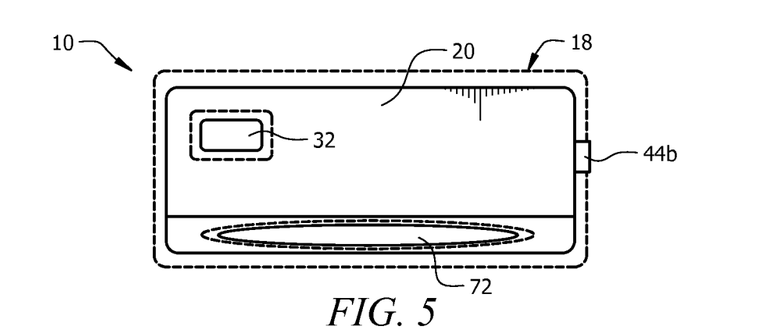

The adapter 10 also comprises a port 32 mounted on the shell 20 and communicatively coupled to the connector 28. The port 32 is depicted in FIGS. 2, 5, and 7. The port 32 is accessible to the user via a cutout in the sleeve 24, as shown in FIG. 5. The port 32 can be substantially the same as the port 30 on the communications device 12 so that functions normally performed using the port 30, such as charging and synchronization of the communications device 12, can be performed without removing the communications device 12 from the case 18.

Figure 3:
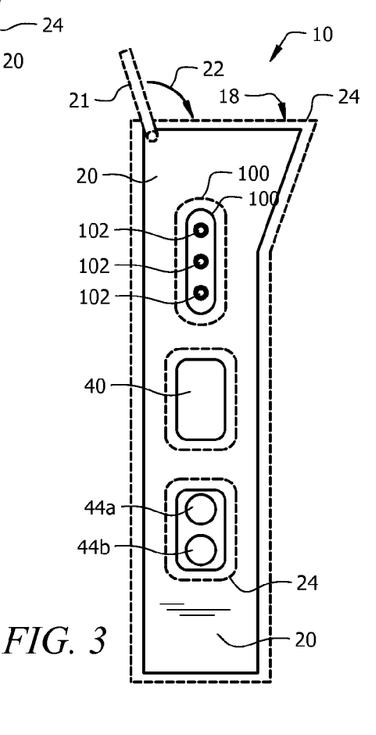
Figure 4:
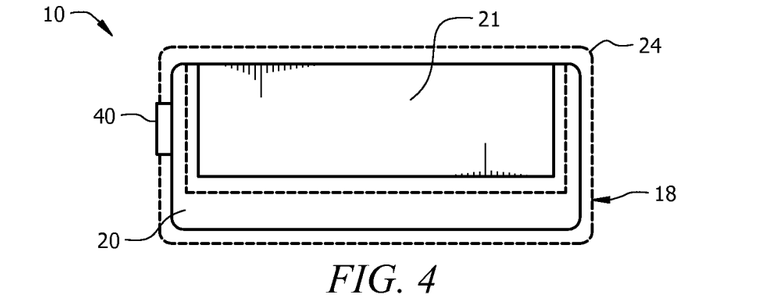

The adapter 10 also includes a key or button 40. The button 40 is mounted on the left side of the shell 20 as shown in FIGS. 1-3. The button 40 can be positioned at other locations on the shell 20 in alternative embodiments. The button 40 is accessible to the user via a cutout in the sleeve 24. The button 40 is communicatively coupled to the connector 28 via a wired connection, so that the button 40 is communicatively coupled to the communications device 12 when the communications device 12 is fully inserted in the shell 20. The button 40, when depressed, generates an electrical output. As discussed below, the communications device 12 is configured to recognize this input as a command to transmit in the PTT mode.

Alternative embodiments of the adapter 10 can be equipped with a wireless transceiver 41a in lieu of the wired connection between the button 40 and the communications device 12. The wireless transceiver 41a can be capable of operating using, for example, the BLUETOOTH wireless connectivity standard. The transceiver 41a can be communicatively coupled to the button 40, and can transmit the output of the button 40 to a corresponding transceiver 41b on the communications device 12. The transceivers 41a, 41b are depicted in phantom in FIG. 7.

Some commercially available cellular phones, smart phones, and PDAs are programmed with the capability to recognize keystrokes from an external keyboard connected to the phone or PDA via a wired or wireless connection. In applications where the communications device 12 has this capability, the communications device 12 can be equipped with a software driver 15 that, in conjunction with the pre-existing external keystroke recognition function of the communications device 12 and the software application 14, cause the communications device 12 to recognize the input signal from the button 40 as a particular keyboard input indicating that the user wishes to transmit in the PTT mode of operation. The software driver 15 is depicted in FIG. 7. In applications where the communications device 12 does not have an external keystroke recognition function, the software driver 15 can be configured so as to cause the communications device 12 to recognize the input signal from the button 40 as the "transmit" command.

The adapter 10 includes two additional buttons or keys 44a, 44b that facilitate user-programmable functions. The keys 44a, 44b are mounted on the left side of the shell 20, below the key 40 as illustrated in FIGS. 1-3. The keys 44a, 44b can be positioned at other locations on the shell 20 in alternative embodiments. The keys 44a, 44b are accessible to the user via a cutout in the sleeve 24.

The keys 44a, 44b, when depressed, each generate an electrical output. The keys 44a, 44b are communicatively coupled to the connector 28 via a wired connection, so that the electrical outputs of the keys 44a, 44b are transmitted to the communications device 12 via the connector 28 and the port 30 when the communications device 12 is fully inserted in the shell 20. In the alternative, the outputs of the keys 44a, 44b can be transmitted to the communications device 12 via the wireless transceivers 41a, 41b discussed above.

The software application 14 on the communications device 12 is configured to facilitate user-programmable functions such as those commonly available on LMR communication devices. For example, the software application can facilitate functions such as scanning, selection of priority or pre-selected channels or groups, clear, etc. The respective outputs of the keys 44a, 44b can be used to select and activate the user-programmable functions. In particular, the software application 14 and the driver 15 cause the communications device 12 to recognize the input signals from the keys 44a, 44b as inputs indicating that the user wishes to select or activate a particular user-programmable function.

In applications where the software application 14 is not configured to facilitate the above-noted user-programmable functions, the driver 15 can be configured to provide this functionality. Alternative embodiments of the adapter 10 can be configured without the keys 44a, 44b.

The adapter 10 further includes a speaker module. The speaker module comprises a speaker 72, and an amplifier 74 that drives the speaker 72. The speaker is depicted in FIGS. 1, 2, and 7; the amplifier is shown in FIG. 7. The speaker 72 and the amplifier 74 are mounted in a cavity within the shell 20, proximate the upper end of the shell 20. The speaker 72 can be positioned at other locations on the shell 20 in alternative embodiments. The shell has an opening formed therein to provide an outlet for the acoustic output of the speaker 72, as illustrated in FIGS. 1 and 2. The speaker module supplements the acoustic output of the speaker 123 of the communications device 12, which may not be able to generate suitable volume in situations where substantial background noise is present during operation of the device 14 in the PTT mode.

The amplifier 74 is communicatively coupled the communications device 12 via the earpiece port or jack 16 of the communications device 12, and a plug 78. The plug 78 is illustrated in FIGS. 2 and 7; the jack 16 is depicted in FIG. 7. The plug 78 is mounted on a bottom inner surface shell 20 as shown in FIG. 2, and is communicatively coupled to the amplifier 74 via a wired connection. The plug 78 is positioned so that it is received by the earpiece jack 16 when the communications device 12 is inserted into the adapter 10. In alternative embodiments, the amplifier 74 can be communicatively coupled to the communications device 12 via the wireless transceivers 41a, 41b discussed above.

Figure 8:
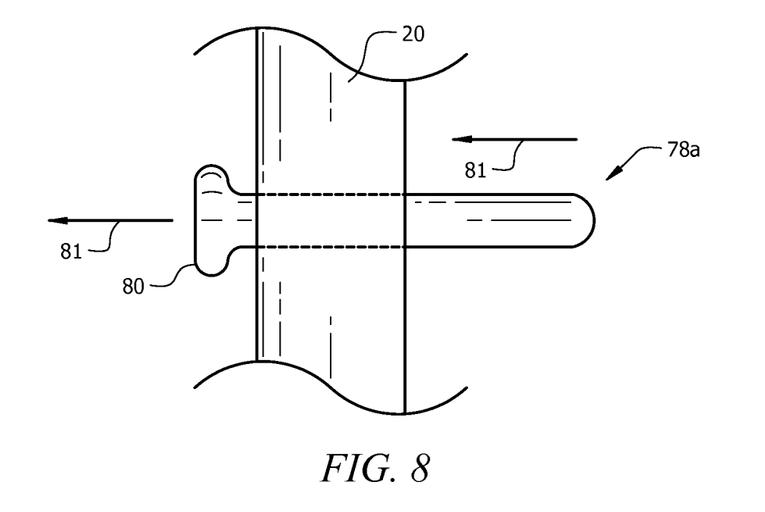
FIG. 8 depicts a movable plug of an alternative embodiment of the adapter shown in FIGS. 1-7, the plug being capable of engaging an earpiece jack of the portable electronic communications device shown in FIGS. 1 and 7.

In applications where the earpiece jack 16 is located on the side of the communications device 12, the plug 78 can be mounted on the shell 20 in a manner that permits the plug 78 to retract so as to permit the communications device 12 to be inserted into the shell 20. For example, FIG. 8 shows an alternative embodiment of the plug 78 in the form of a plug 78a. The plug 78a is mounted on the side of the shell 20 so that the plug 78a can translate outwardly, in the direction denoted by the arrows 81 in FIG. 8. This feature permits the plug 78a to move out of the way of the communications device 12 as the communications device 12 is inserted in the shell 20. The plug 78a can be equipped with a tab 80 or other feature that can be grasped by the user to pull the plug 78a outwardly in relation to the shell 20. Once the communications device 12 has been placed in the shell 20, the user can push the tab 80 inwardly, so that the plug 78a engages the earpiece jack 16.

Alternative embodiments of the adapter 10 can be equipped with a speaker module that amplifies the acoustic output of the speaker of the communications device 12. The speaker module can be positioned so that the acoustic output of the built-in speaker of the communications device 12 is directed at the speaker module. This type of speaker module does not need to be communicatively coupled to the communications device 12 via the earpiece jack 16 or any other type of electrical or wireless connection. Other alternative embodiments of the adapter 10 can be configured without any speaker module.

The adapter 10 includes a microphone 82. The microphone 82 is mounted on the shell 20, proximate the lower end thereof as illustrated in FIGS. 1 and 2. The microphone 82 can be positioned at other locations on the shell 20 in alternative embodiments. The microphone 82 is communicatively coupled the communications device 12 via the plug 78 and the earpiece jack 16 of the communications device 12, as shown in FIG. 7. The plug 78 is communicatively coupled to the microphone 82 via a wired connection. In alternative embodiments, the microphone 82 can be communicatively coupled to the communications device 12 via the wireless transceivers 41a, 41b discussed above.

The microphone 82 may be equipped with noise-cancellation features. The noise-cancellation features can potentially improve the clarity of the voice transmissions made using the communications device 12, particularly in situations where substantial background noise is present during operation of the device 14 in the PTT mode. Suitable noise-cancellation features are described, for example, in U.S. patent application Ser. No. 12/403,646, filed Mar. 13, 2009 and titled "Noise Error Amplitude Reduction," the contents of which are incorporated by reference herein in their entirety.

Alternative embodiments of the adapter 10 can be equipped with a microphone that amplifies the user's voice, and generates an acoustical rather than an electrical output. The microphone can be positioned so that its acoustical output is directed at the microphone 134 of the communications device 12. This type of microphone does not need to be communicatively coupled to the device 12 via the earpiece jack 16 or any other type of electrical or wireless connection. Other alternative embodiments of the adapter 10 can be configured without the microphone 82.

Figure 6:
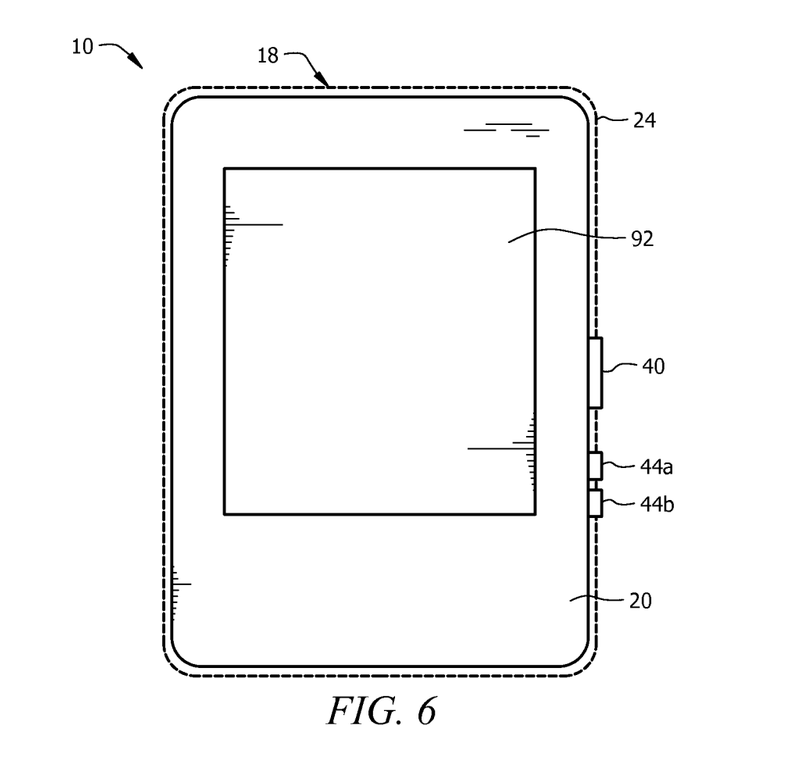

The adapter 10 further comprises a battery 90, depicted in FIG. 7. The battery 90 provides power to the amplifier 74, the microphone 82, and if necessary, the keys 40, 41a, 41b. The battery 90 can also supplement the power provided by the battery 129 of the communications device 12, to help meet the heightened power demands that can be associated with PTT and other half-duplex communication modes. The battery 90 is housed in a cavity formed in the shell 20, and can be accessed via a removable panel 92 that forms part of the rear of the shell 20 as illustrated in FIG. 6.

The battery 90 is electrically connected to the connector 28 of the adapter 10, as illustrated in FIG. 7. This arrangement allows the battery 90 to provide power to the communications device 12 via the USB port 30 on the communications device 12. This arrangement can also facilitate recharging of the battery 90 through the USB port 32 on the shell 20, provided the adapter 10 is equipped with appropriate charging circuitry. The battery 90 can be any rechargeable battery compatible with the communications device 12. For example, the battery 90 can be a lithium-ion battery.

The use of the battery 90 is disclosed for exemplary purposes only. Alternative embodiments of the adapter 10 can be configured without an external power source such as the battery 90, if the electrical-power requirements for a specific application do not necessitate external power.

The shell 20 and sleeve 24 each have an elongated cutout 100 formed therein, as depicted in FIG. 3. The cutout 100 is aligned with the on/off and volume-control buttons 102 of the communications device 12, and serves as a pass through that permits the user to access and press the buttons 102. Alternative embodiments can be equipped with a mechanical actuator for actuating the buttons 102. The mechanical actuator can be used, for example, in applications where the combined thickness of the shell 20 and the sleeve 24 make it difficult or impractical for the user to directly press the buttons 102. The buttons 102 are depicted at the locations shown in the figures for exemplary purposes only. The buttons 102 can be disposed at other locations on other types of communication devices 12.

I claim:

1. A communications system, comprising:
   a portable electronic communications device comprising a housing in which electronic components are disposed, the electronic components comprising
      a processor,
      a memory communicatively coupled to the processor and having computer-executable instructions stored thereon, and
      a transceiver communicatively coupled to the processor and operable to send and receive radio-frequency signals to and from a telecommunications network, the computer-executable instructions being configured so that the computer-executable instructions, when executed on the processor, cause the portable electronic communications device to transmit only when receiving an input corresponding to a transmit command; and
   an adapter providing an accessory for the portable electronic communications device, the adaptor comprising (1) a case configured to receive the portable electronic communications device and (2) a key mounted on the case;
   wherein the key is communicatively coupled to the portable electronic communications device when the portable electronic communications device is disposed in the case; and
   wherein the key generates on a selective basis the input corresponding to the transmit command.

2. The communications system of claim 1, wherein the adapter further comprises a speaker mounted on the case and being operable to produce an acoustic output in response to an input from the portable electronic communications device.

3. The communications system of claim 2, wherein the adapter further comprises a plug mounted on the case and electrically connected to the speaker, wherein:
   the input from the portable electronic communications device is an electrical input; and
   the plug is configured to engage an earpiece jack on the portable electronic communications device when the portable electronic communications device is disposed in the case so that the plug is operable to transmit the electrical input to the speaker.

4. The communications system of claim 1, wherein the adapter further comprises a microphone mounted on the case and being operable to generate an output responsive to an acoustic input thereto.

5. The communications system of claim 4, wherein the adapter further comprises a plug mounted on the case and electrically connected to the microphone, wherein:
   the output of the microphone is an electrical output; and
   the plug is configured to engage an earpiece jack of the portable electronic communications device when the portable electronic communications device is disposed in the case so that the plug is operable to transmit the electrical output to the portable electronic communications device.

6. The communications system of claim 4, wherein the microphone is a noise-canceling microphone.

7. The communications system of claim 1, wherein the case comprises a rigid shell, and a resilient sleeve disposed around the shell.

8. The communications system of claim 1, wherein the adapter further comprises a first electrical connector mounted on the case and configured to engage an electrical connector on the portable electronic communications device when the portable electronic communications device is disposed in the case.

9. The communications system of claim 8, wherein the adapter further comprises a battery mounted on the case, electrically connected to the first electrical connector, and being operable to provide electrical power to the portable electronic communications device when the portable electronic communications device is disposed in the case.

10. The communications system of claim 8, wherein the first electrical connector is a universal serial bus connector.

11. The communications system of claim 8, further comprising a second electrical connector electrically connected to the first electrical connector, mounted on the case, and configured to be accessible from an exterior of the case.

12. The communications system of claim 8, wherein the key is electrically connected to the first electrical connector so that the key is communicatively coupled to the portable electronic communications device by way of the first electrical connector and the electrical connector on the portable electronic communications device when the portable electronic communications device is disposed in the case.

13. The communications system of claim 1, wherein:
the adapter further comprises a first wireless transceiver electrically connected to the key;
the portable electronic communications device further comprises a second wireless transceiver communicatively coupled to the processor; and
the first wireless transceiver is configured to communicate with the second wireless transceiver so that the key is communicatively coupled to the portable electronic communications device by way of the first and second wireless transceivers.

14. A communications system, comprising:
a portable electronic communications device comprising a processor, a memory communicatively coupled to the processor, computer-executable instructions stored on the memory, and a transceiver communicatively coupled to the processor and operable to send and receive radio-frequency signals to and from a telecommunications network, the computer-executable instructions being configured so that the computer-executable instructions, when executed on the processor, cause the portable electronic communications device to transmit only when receiving an input corresponding to a transmit command; and
an adapter comprising a case configured to receive the portable electronic communications device, and a key mounted on the case, wherein the key is communicatively coupled to the portable electronic communications device when the portable electronic communications device is disposed in the case and the key is operable to generate on a selective basis the input corresponding to the transmit command;
wherein:
the computer-executable instructions are further configured so that the computer-executable instructions, when executed on the processor, cause the portable electronic communications device to perform a user-programmable function when receiving an input corresponding to the user-programmable function; and
the adapter further comprises a second key mounted on the case, wherein the second key is communicatively coupled to the portable electronic communications device when the portable electronic communications device is disposed in the case and the second key is operable to generate on a selective basis the input corresponding to the user-programmable function.

15. The communications system of claim 1, wherein the portable electronic communications device is a smart phone.

16. An adapter for use with a portable electronic communications device as an accessory, comprising:
a case configured to receive the portable electronic device having a housing in which a plurality of electronic components are disposed; and
a key mounted on the case, the key being communicatively coupled to the portable electronic communications device via a wired or wireless communications link when the portable electronic communications device is disposed in the case and being operable to provide the portable electronic communications device with an input signal on a selective basis via the wired or wireless communications link, the input signal corresponding to a transmit command for causing the portable electronic device to transmit a signal wirelessly to another remotely located electronic device.

17. The adapter of claim 16, wherein the input signal is a signal capable of being interpreted by the portable electronic communications device as a transmit command when the portable electronic communications device is operating in a half-duplex mode.

18. The adapter of claim 16, further comprising a speaker mounted on the case and being operable to produce an acoustic output in response to an input from the portable electronic communications device.

19. The adapter of claim 18, further comprising a plug mounted on the case and electrically connected to the speaker, wherein:
the input from the portable electronic communications device is an electrical input; and
the plug is configured to engage an earpiece jack on the portable electronic communications device when the portable electronic communications device is disposed in the case so that the plug is operable to transmit the electrical input to the speaker.

20. The adapter of claim 16, further comprising a microphone mounted on the case and being operable to generate an output responsive to an acoustic input thereto.

21. The adapter of claim 20, further comprising a plug mounted on the case and electrically connected to the microphone, wherein:
the output of the microphone is an electrical output; and
the plug is configured to engage an earpiece jack on the portable electronic communications device when the portable electronic communications device is disposed in the case so that the plug is operable to transmit the electrical output to the portable electronic communications device.

22. The adapter of claim 20, wherein the microphone is a noise-canceling microphone.

23. The adapter of claim 16, wherein the case comprises a rigid shell, and a resilient sleeve disposed around the shell.

24. The adapter of claim 16, further comprising a first electrical connector mounted on the case and configured to engage an electrical connector on the portable electronic communications device when the portable electronic communications device is disposed in the case.

25. The adapter of claim 24, further comprising a battery mounted on the case, electrically connected to the first electrical connector, and being operable to provide electrical power to the portable electronic communications device when the portable electronic communications device is disposed in the case.

26. The adapter of claim 24, further comprising a second electrical connector electrically connected to the first electrical connector, mounted on the case, and configured to be accessible from an exterior of the case.

27. The adapter of claim 24, wherein the key is electrically connected to the first electrical connector so that the key is communicatively coupled to the portable electronic communications device by way of the first electrical connector and the electrical connector on the portable electronic communications device when the portable electronic communications device is disposed in the case.

28. An adapter for use with a portable electronic communications device as an accessory, comprising:
- a case configured to receive the portable electronic device having a housing in which a plurality of electronic components are disposed; and
- a key mounted on the case, the key being communicatively coupled to the portable electronic communications device when the portable electronic communications device is disposed in the case and being operable to provide the portable electronic communications device with an input on a selective basis; and
- a first wireless transceiver electrically connected to the key, the first wireless transceiver being configured to communicate with a second wireless transceiver associated with the portable electronic communications device so that the key is communicatively coupled to the portable electronic communications device by way of the first and second wireless transceivers.

\* \* \* \* \*